US006762878B2

United States Patent
Park et al.

(10) Patent No.: US 6,762,878 B2
(45) Date of Patent: Jul. 13, 2004

(54) GAIN CONTROL DEVICE AND METHOD FOR ERBIUM DOPED FIBER AMPLIFIER

(75) Inventors: Tae-Sung Park, Suwon-shi (KR); Do-In Choi, Seoul (KR); Yun-Je Oh, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/947,796

(22) Filed: Sep. 6, 2001

(65) Prior Publication Data

US 2002/0027706 A1 Mar. 7, 2002

(30) Foreign Application Priority Data

Sep. 6, 2000 (KR) ........................................ 2000-52684

(51) Int. Cl.[7] .............................................. H04B 10/12
(52) U.S. Cl. ........................... 359/341.42; 359/341.41; 359/341.43; 359/333
(58) Field of Search ....................... 359/341.41, 341.42, 359/341.43, 333

(56) References Cited

U.S. PATENT DOCUMENTS

| | | | | |
|---|---|---|---|---|
| 5,818,629 A | * | 10/1998 | Kinoshita .................. 359/194 |
| 5,894,362 A | * | 4/1999 | Onaka et al. ............... 359/110 |
| 5,966,236 A | * | 10/1999 | Okuno ....................... 359/130 |
| 6,072,601 A | * | 6/2000 | Toyohara .................... 358/484 |
| 6,341,034 B1 | * | 1/2002 | Sun et al. ................. 359/337.1 |
| 6,366,393 B1 | * | 4/2002 | Feulner et al. ............ 359/337 |
| 6,373,625 B1 | * | 4/2002 | Kobayashi et al. ..... 359/341.41 |
| 6,407,854 B1 | * | 6/2002 | Shum ..................... 359/337.11 |
| 6,417,965 B1 | * | 7/2002 | Ye et al. .................. 359/341.4 |
| 6,452,715 B1 | * | 9/2002 | Friedrich .................... 359/110 |
| 6,529,319 B2 | * | 3/2003 | Youn et al. ............ 359/341.41 |

* cited by examiner

*Primary Examiner*—Thomas G. Black
*Assistant Examiner*—Stephen Cunningham
(74) *Attorney, Agent, or Firm*—Cha & Reiter, L.L.C.

(57) ABSTRACT

This invention provides a gain control device and method for an erbium doped fiber amplifier that is capable of maintaining a constant gain irrespective of the intensity variation of the input signal light. The gain control device includes: a pumping light source for outputting pumping light adapted to excite erbium ions for the amplification of an input optical signal while outputting a pumping light sensing signal indicative of the power of the pumping light; a photo-detecting unit for outputting an input light sensing signal indicative of the power of the input optical signal; a control unit for reading out from a look-up table a reference power corresponding to the optical signal power indicated by the input light sensing signal and outputting a reference signal indicative of the read-out reference power; an automatic gain control circuit for conducting a comparison between the reference power and the pumping light power based on the pumping light sensing signal and the reference signal, and for outputting a power compensating signal adapted to compensate for the difference between the reference power and the pumping light power; and, a pumping light source driving unit for controlling the level of a bias current supplied to the pumping light source based on the power compensating signal.

4 Claims, 4 Drawing Sheets

GAIN CONTROL DEVICE AND METHOD FOR ERBIUM DOPED FIBER AMPLIFIER

CLAIM OF PRIORITY

This application makes reference to, incorporates the same herein, and claims all benefits accruing under 35 U.S.C. Section 119 from an application for "GAIN CONTROL DEVICE AND METHOD FOR ERBIUM DOPED FIBER AMPLIFIER," filed earlier in the Korean Industrial Property Office on Sep. 6, 2000, and there duly assigned Ser. No. 52684/2000.

BACKGROUND OF THE INVENTION

1. Field of the Invention

The present invention relates to an erbium doped fiber amplifier, and more particularly to a gain control device and method for an erbium doped fiber amplifier.

2. Description of the Related Art

Conventional erbium doped fiber amplifiers (EDFAs) would experience gain transients with the deletion or addition of one or more channels. In order to correct degradation in the system's bit error rate, a gain control device is required to automatically maintain a constant gain among channels when the number of input channels and the intensity variation of input signal light changes. Although optical gain control is effective in an erbium doped fiber amplifier, problems arise that are associated with complexity in the structure of the erbium doped fiber amplifier and a condition variation depending on the position of the erbium doped fiber amplifier.

Another method uses the adjustment of pumping light by controlling the bias current supplied to the source of the pumping light. However, when this method is applied to a wavelength division multiplexing system in which the number of channels in an optical signal may be variable, it is difficult to control the intensity of pumping light using a simple analog circuit as the intensity of the optical signal exhibit variable characteristics. Furthermore, the above gain control method requires the suppression of the temporal transient phenomenon occurring at the output optical signal due to an increase/decrease in the number of channels. Therefore, there is a need in the art for controlling gain in optical fiber amplifiers that solve the problems indicated above.

SUMMARY OF THE INVENTION

The present invention is directed to a gain control device and method for an erbium doped fiber amplifier, which is suitable for a wavelength division multiplexing system and capable of maintaining a constant gain irrespective of the intensity variation of optical signals.

The invention provides a gain control device and method for an erbium doped fiber amplifier, which is capable of suppressing a temporal transient phenomenon occurring at the output optical signal.

In accordance with one aspect, the present invention provides a gain control device for an erbium doped fiber amplifier adapted to amplify an input optical signal in accordance with an induced discharge of erbium ions. The gain control device includes:

a pumping light source for outputting pumping light adapted to excite the erbium ions while detecting a part of the pumping light, thereby outputting a pumping light sensing signal indicative of the power of the pumping light;

a photo-detecting unit for partially detecting the optical signal inputted to the erbium doped fiber amplifier, thereby outputting an input light sensing signal indicative of the power of the input optical signal;

a control unit for reading out from a look-up table a reference power corresponding to the optical signal power indicated by the input light sensing signal and for outputting a reference signal indicative of the read-out reference power;

an automatic gain control circuit for conducting a comparison between the reference power and the pumping light power based on the pumping light sensing signal and the reference signal, and for outputting a power compensating signal adapted to compensate for the difference between the reference power and the pumping light power; and, a pumping light source driving unit for controlling the level of a bias current supplied to the pumping light source based on the power compensating signal.

In accordance with another aspect, the present invention provides a gain control method for an erbium doped fiber amplifier adapted to amplify an input optical signal in accordance with an induced discharge of erbium ions, wherein the erbium doped fiber amplifier includes a pumping light source for outputting pumping light adapted to excite the erbium ions, and a pumping light source driving unit for applying a bias current to the pumping light source. The method includes:

deriving the number of channels in the optical signal inputted to the erbium doped fiber amplifier from the input optical signal power;

if the derived channel number is different from a reference number of channels, outputting a temporal transient suppressing signal adapted to compensate for the difference between the derived channel number and the reference channel number to the pumping light source unit;

reading out a reference power corresponding to the power of the input optical signal from a look-up table;

comparing the power of the pumping light with the read-out reference power, thereby deriving the difference between the pumping light power and the reference power; and, outputting a power compensating signal adapted to compensate for the power difference to the pumping light source driving unit.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE PREFERRED EMBODIMENT

In the following description, for purposes of explanation rather than limitation specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
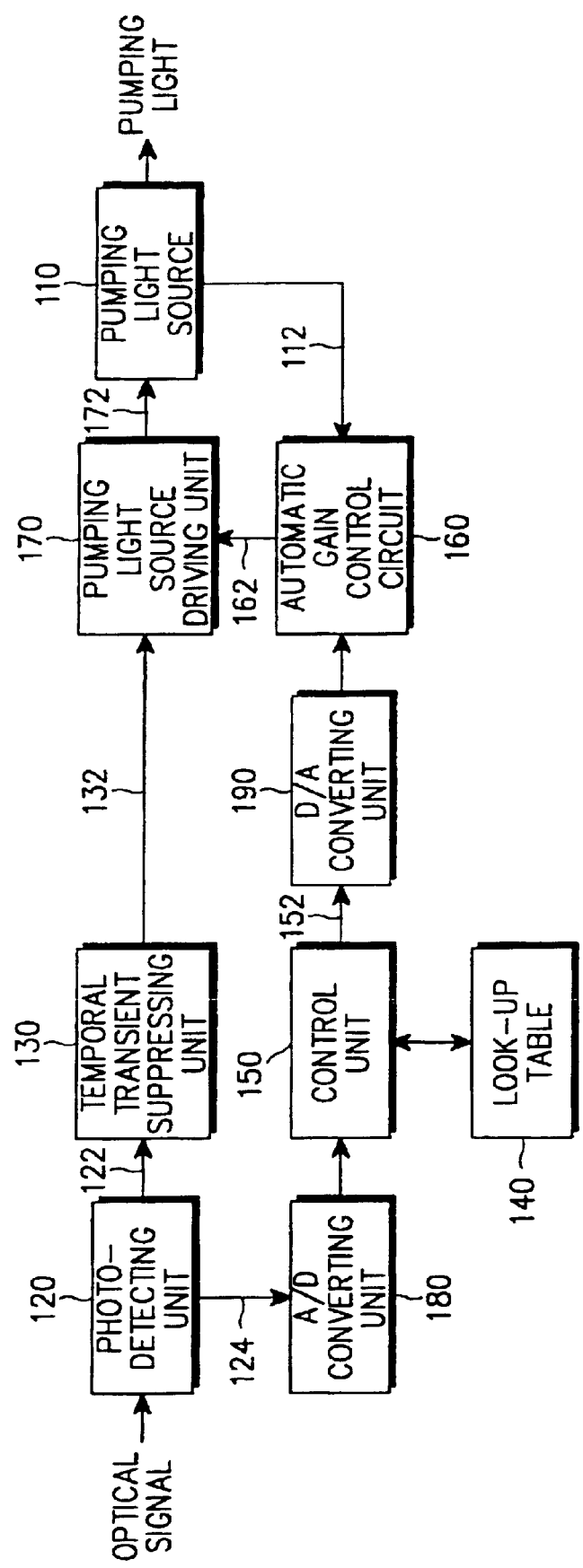
FIG. 1 is a block diagram illustrating the gain control device for an erbium doped fiber amplifier according to a preferred embodiment of the present invention.

FIG. 1 is a block diagram illustrating the gain control device for an erbium doped fiber amplifier according to the preferred embodiment of the present invention. As shown in FIG. 1, the gain control device includes a pumping light source 110, a photo-detecting unit 120, a temporal transient suppressing unit 130, a look-up table 140, a control unit 150, an automatic gain control circuit 160, a pumping light source driving unit 170, an analog/digital (A/D) converting unit 180, and a digital/analog (D/A) converting unit 190.

The pumping light source 110 outputs a pumping light operative to excite erbium ions while detecting part of the pumping light, to generate a pumping light sensing signal 112 indicative of the power level of the pumped light. To this end, the pumping light source 110 may include a laser diode for outputting the pumping light, a beam splitter for transmitting part of the pumping light in one direction while reflecting the remaining part of the pumping light in the other direction, and a photodiode for detecting the intensity of the reflected light.

The photo-detecting unit 120 partially detects an optical signal inputted to the erbium doped fiber amplifier, thereby outputting input light sensing signals 122 and 124 each indicative of the power level of the input optical signal. To achieve this, the photo-detecting unit 120 may include a beam splitter for transmitting part of the input optical signal inone direction while reflecting the remaining part of the input optical signal in the other direction, and a photodiode for detecting the intensity level of the reflected light.

The temporal transient suppressing unit 130 calculates the number of channels in the optical signal based on the input light sensing signal 122. When the calculated number of channels is different from a predetermined reference number of channels, the temporal transient suppressing unit 130 outputs a temporal transient suppressing signal 132 to the pumping light source driving unit 170 in order to compensate for the difference in the number of channels. The analog/digital converting unit 180 converts the input light sensing signal 124 into a digital signal. The look-up table 140 stores linear data about diverse power values of optical signals that are inputable to the erbium doped fiber amplifier. That is, the look-up table 140 stores data about the power values of pumping light between the maximum and minimum levels of pumping light that correspond to the maximum and minimum levels of optical signals inputable to the erbium doped fiber amplifier.

Figure 2:
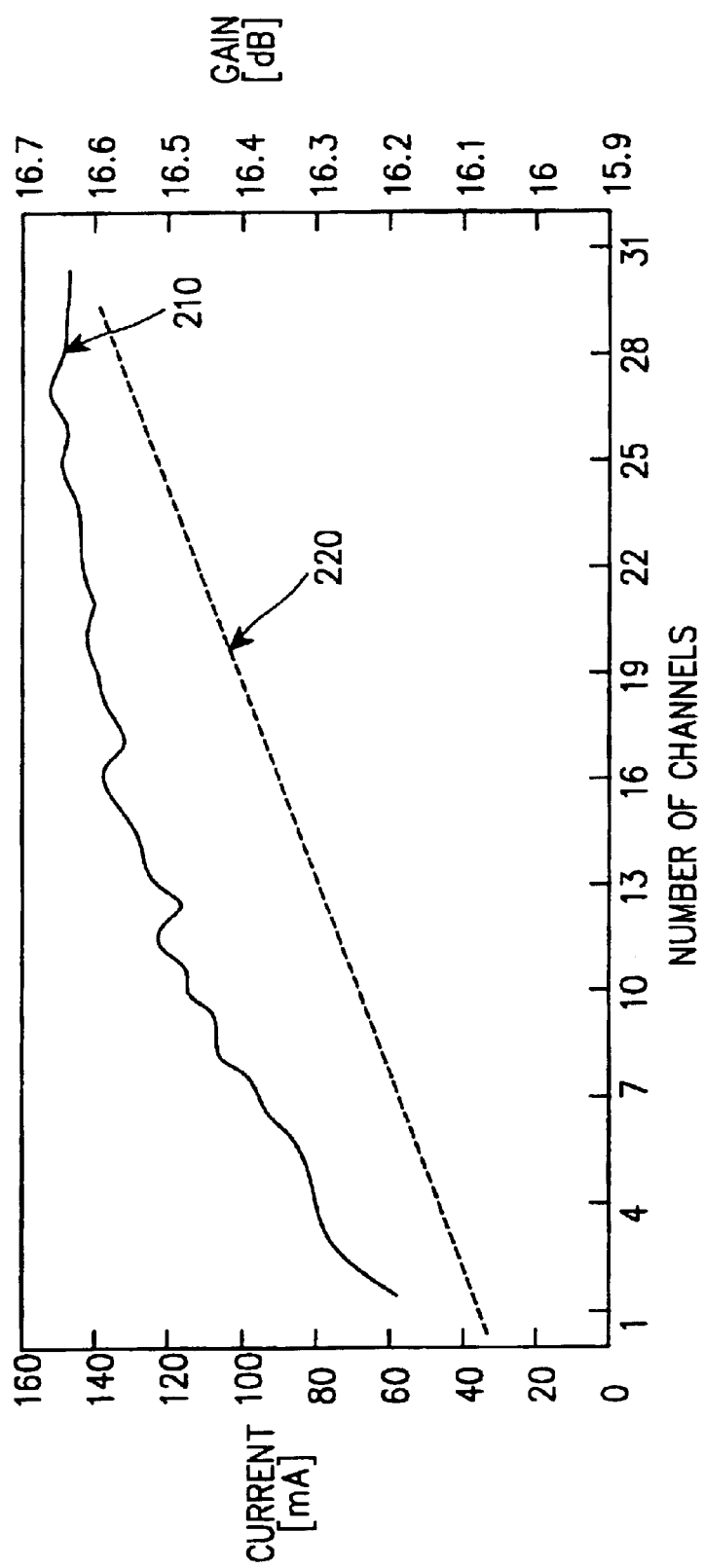
FIG. 2 is a graph illustrating data to be stored in a look-up table shown in FIG. 1.

FIG. 2 is a graph illustrating data that is stored in the look-up table 140. Referring to FIG. 2, the number of channels in an input optical signal and the gain of the erbium doped fiber amplifier obtainable by supplying a bias current 172 to the pumping light source 110 are indicated. In particular, the solid line 210 represents the curve indicative of the characteristics of the pumping light source 110 or erbium doped fiber amplifier, whereas the phantom line 220 represents a line indicative of data stored in the look-up table 140. Referring to FIG. 2, it can be seen that the characteristic graph of the pumping light source 110 or erbium doped fiber amplifier has a gradient gently increasing in accordance with the increase level of the bias current 172.

Referring back to FIG. 1, the control unit 150 reads out from the look-up table 140 a reference power corresponding to the optical signal power indicated by the input light sensing signal 124, then outputs a reference signal 152 indicative of the read-out reference power. The D/A converting unit 190 converts the reference signal 152 into an analog signal. The automatic gain control circuit 160 conducts a comparison between the converted reference signal 152 and pumping light power based on the pumping light sensing signal 112 then outputs a power compensating signal 162 for compensating the difference between the reference power and pumping light power.

The pumping light source driving unit 170 controls the level of the bias current 172 supplied to the pumping light source 110 based on the power compensating signal 162.

Figure 3:
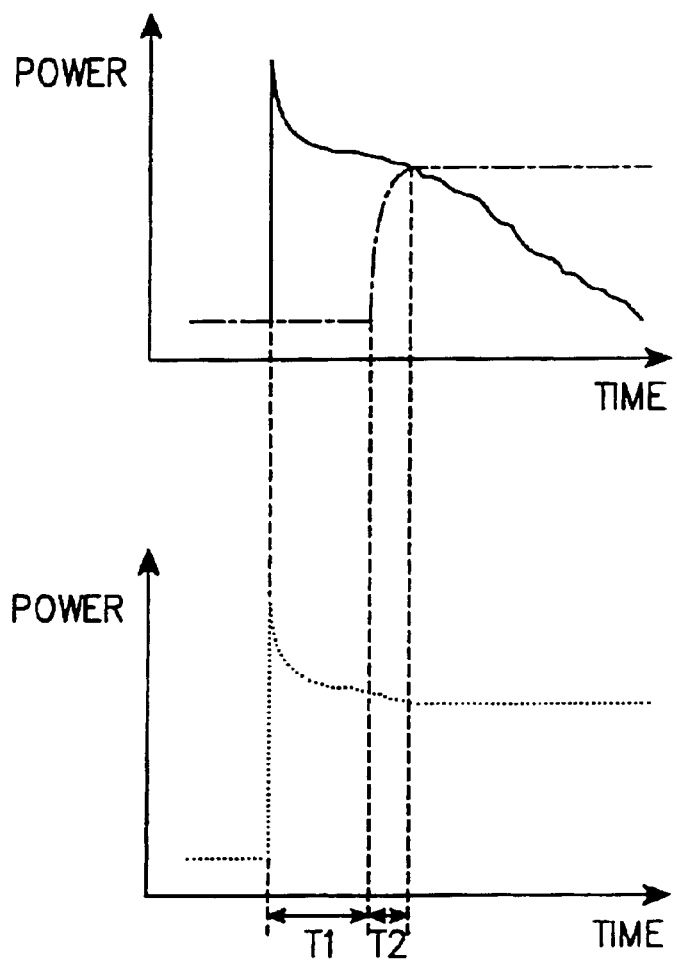
FIG. 3 illustrates graphs indicating the operations of the gain control device shown in FIG. 1; and, FIG. 4 is a flow chart illustrating a gain control method for an erbium doped fiber amplifier according to a preferred embodiment of the present invention.

FIG. 3 illustrates a graphic illustration indicating the operations of the gain control device shown in FIG. 1. The upper graph of FIG. 3 shows the temporal transient suppressing signal 132 and the power compensating signal 162 generated as the number of channels in the input optical signal increases. Referring to this graph, it can be seen that the temporal transient suppressing signal 132 is outputted simultaneously as an increase in the number of channels is sensed, whereas the power compensating signal 162 is generated later than the temporal transient suppressing signal 132 due to a time delay T1 occurring during the operation of the control unit 150, and a time delay T2 resulting from the setting of the automatic gain control circuit 160.

The lower graph of FIG. 3 shows a variation in the power level of the pumping light in response to the temporal transient suppressing signal 132 and the power compensating signal 162. Referring to this graph, it can be seen that the power level of the pumping light in response to the temporal transient suppressing signal 132 is maintained without any delay, so that it increases simultaneously with the increase in the number of channels. Following this increase, the power of the pumping light decreases gradually then stabilizes in accordance with the power compensating signal 162 that is generated subsequently. Hence, the temporal transient suppressing signal 132 suppresses the temporal transient phenomenon occurring in the output from the erbium doped optical fiber amplifier due to an increase or decrease in the number of channels in the input optical signal. Also, the power compensating signal 162 stabilizes the output from the erbium doped fiber amplifier.

Figure 4:
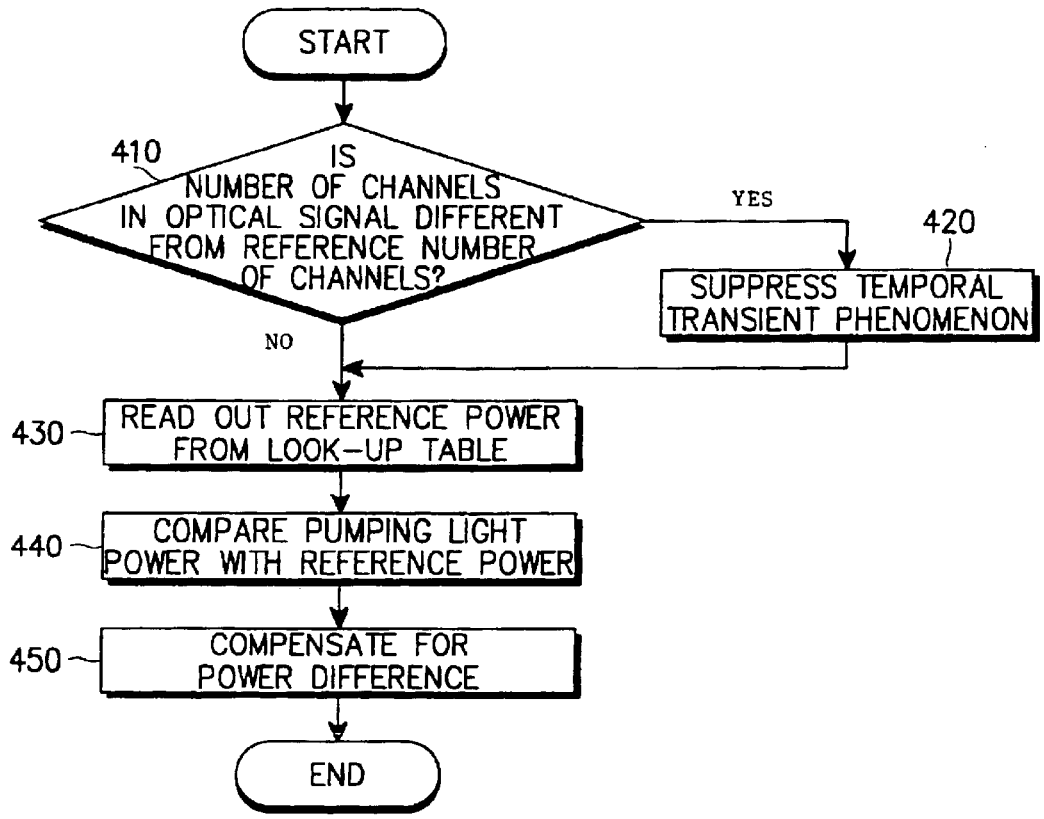

FIG. 4 is a flow chart illustrating the gain control method for the erbium doped fiber amplifier according to the preferred embodiment of the present invention. As shown in FIG. 4, the gain control method involves a channel number comparing step 410, a temporal transient phenomenon suppressing step 420, a reference power reading-out step 430, and a reference power/pumping light power comparing step 440, and a power difference compensating step 450.

The channel number comparing step 410 is a step of deriving the number of channels in an optical signal inputted to the erbium doped fiber amplifier and comparing the derived number of channels with a predetermined reference channel number.

If the derived channel number is different from the reference channel number a temporal transient suppressing signal 132 is applied to the pumping light source driving unit 170 in the temporal transient phenomenon suppressing step 420, in order to compensate for the difference between the derived channel number and the reference channel number. In response to the temporal transient suppressing signal 132, the pumping light source driving unit 170 controls the level of the bias current supplied to the pumping light source. That is, the pumping light source driving unit 170 increases the level of the bias current if the number of channels in the input optical signal is more than the reference channel number, while decreasing the level of the bias current when the number of channels in the input optical signal is less than the reference channel number.

The reference power reading-out step 430 is a step of reading out, from a look-up table with diverse power values of optical signals, including the reference power corresponding to the power of the optical input signal. The data stored in the look-up table is linear data, such that the maximum and minimum power level of pumping light increases linearly with respect to the power level of the optical input signal.

The reference power/pumping light power comparing step 440 is a step of comparing the power of the pumping light outputted from the pumping light source 110 with the read-out reference power 152, thereby deriving the difference between those powers.

The power difference compensating step 450 is a step of outputting to the pumping light source driving unit 170 a power compensating signal adapted to compensate the power difference. In accordance with the execution of this power difference compensating step 450, the power of the pumping light is stabilized and maintained at a constant power level.

As apparent from the above description, the gain control device and method for the erbium doped fiber amplifier according to the present invention have an advantage in that the optical fiber amplifier can be stabilized to maintain a constant gain irrespective of the intensity variation of the input signal light, by utilizing a look-up table to obtain data to compensate for the gain variations due to the fluctuation of the output light.

In addition, it is possible to suppress a temporal transient phenomenon occurring at the output of the erbium doped fiber amplifier by generating a temporary transient suppressing signal to adjust the power level supplied to the pumping light source.

While this invention has been described in connection with what is presently considered the most practical and preferred embodiment, it is to be understood that the invention is not limited to the disclosed embodiment, but intended to cover various modifications within the spirit and the scope of the appended claims.

What is claimed is:

1. A gain control device for an erbium doped fiber amplifier adapted to amplify an input optical signal in accordance with an induced discharge of erbium ions, comprising:

a pumping light source for outputting pumping light adapted to excite the erbium ions, while detecting a part of the pumping light, to generate a pumping light sensing signal indicative of the power of the pumping light;

a photo-detecting unit for partially detecting the optical signal inputted to the erbium doped fiber amplifier, to generate an input light sensing signal indicative of the power of the optical input signal;

a control unit for retrieving a reference power corresponding to the optical signal power indicated by the input light sensing signal from a predetermined table, and for outputting a reference signal indicative of the read-out reference power;

an automatic gain control circuit for conducting a comparison between the reference power and the pumping light power based on the pumping light sensing signal and the reference signal, and for outputting a power compensating signal adapted to compensate the difference between the reference power and the pumping light power; and, a pumping light source driving unit for controlling the level of a bias current supplied to the pumping light source in response to the power compensating signal; and a temporal transient suppressing unit for calculating the number of channels in the optical signal based on the input light sensing signal and for outputting a temporal transient suppressing signal to the pumping light source driving unit that is parallel to the power compensating signal from the automatic rain control circuit, said temporal transient suppressing signal being simultaneously output as an increase in a number of channels is sensed, and said temporal transient suppressing unit generates the temporal transient signal before the power compensating signal is adjusted to compensate for the difference in the number of channels if the calculated number of channels is different from a predetermined reference number of channels.

2. The gain control device according to claim 1, further comprising:

an analog/digital converting unit for converting the input light sensing signal into a digital signal and for outputting the digital signal to the control unit; and, a digital/analog converting unit for converting the reference signal into an analog signal and for outputting the analog signal to the automatic gain control circuit.

3. The gain control device according to claim 1, wherein the predetermined table stores data about the power values of pumping light increasing linearly with respect to the optical input signal.

4. A gain control method for an erbium doped fiber amplifier adapted to amplify an input optical signal in accordance with an induced discharge of erbium ions, wherein the erbium doped fiber amplifier includes a pumping light source for outputting pumping light adapted to excite the erbium ions, and a pumping light source driving unit for applying a bias current to the pumping light source, the method comprising the steps of:

deriving the number of channels in the optical signal inputted to the erbium doped fiber amplifier from the power of the input optical signal;

if the derived channel number is different from a reference number of channels, outputting to the pumping light source unit a temporal transient suppressing signal adapted to compensate for the difference between the derived channel number and the reference channel number;

reading out, from a look-up table, a reference power corresponding to the power of the optical input signal;

comparing a power of the pumping light with the read-out reference power, to determine a difference between the pumping light power and the reference power; and, outputting, to the pumping light source driving unit, a power compensating signal adapted to compensate for the power difference; and outputting a temporal transient suppressing signal to the pumping light source driving unit that is parallel to the power compensating signal, said temporal transient suppressing signal is simultaneously output when an increase in a number of channels is sensed, wherein a temporal transient suppressing unit generates the temporal transient suppressing signal before the power compensating signal is adjusted to compensate for the difference in the number of channels if the calculated number of channels is different from a predetermined reference number of channels.

* * * * *